July 14, 1931.

J. B. GLOWACKI

RENEWABLE FUSE ELEMENT

Original Filed Aug. 8, 1923

Re. 18,128

2 Sheets-Sheet 1

Witnesses

J. W. Angell

O. Hartmann

Inventor

John B. Glowacki by Chas. W. Hill

Atty.

July 14, 1931.

J. B. GLOWACKI
RENEWABLE FUSE ELEMENT

Re. 18,128

Original Filed Aug. 8, 1923 2 Sheets-Sheet 2

Witnesses
J. W. Angell
O. Hartmann

Inventor
John B. Glowacki
by Charles O. Filler
Atty

Reissued July 14, 1931

Re. 18,128

UNITED STATES PATENT OFFICE

JOHN B. GLOWACKI, OF CHICAGO, ILLINOIS

RENEWABLE FUSE ELEMENT

Original No. 1,573,392, dated February 16, 1926, Serial No. 656,316, filed August 8, 1923. Application for reissue filed May 26, 1931. Serial No. 520,182.

This invention relates to variable capacity renewable fuse elements for so-called cartridge fuses required for electrical circuits of varying current requirement.

Heretofore it has been a common and dangerous practice followed not only by the general public but by the less informed workmen to substitute a higher capacity fuse for one that has blown in service, with a consequent decrease in protection to the delicate circuits, motors and machinery intended to be protected thereby.

It is accordingly an object of this invention to develop a form of single and multiple fuse elements wherein it is impossible to increase the capacity of the fuse as originally assembled at the factory as the fuse element will be replaceable only by another of the same capacity.

It is accordingly an object of this invention to standardize on a few sizes of cartridge fuses for many capacities by providing a form of link in several capacities which may be used singly or in multiples in the various sizes of containers to give a large number of capacities with a relatively small number of parts.

It is another object of this invention to form a cartridge fuse element having rectangular oblong apertures at the points where it is desired to confine the fusing under overload, whereby the element may be nicely calibrated and the capacity thereby accurately predetermined.

It is further an object of this invention to provide parallel narrow fusing sections in a fuse element of appreciable length whereby fusing will affect a sufficient length of the element to insure proper breaking of the circuit.

It is a further object of this invention to provide identical fuse elements that can be permanently assembled in a desired multiple arrangement whereby fusing of the narrow portions of the element will allow a large part of the fuse to drop out of the path of any arc formed between the terminals of the cartridge.

It is another object of this invention to provide a form of fuse link that will be self-aligning in assembly whereby the assembly operation is facilitated and risk of bending of and consequent injury to the fuse element eliminated.

It is still another object of this invention to provide means for preventing alteration of the capacity of a given assembly after it has been sold, without interfering with the proper renewal of a blown fuse element.

Other and further important objects of this invention will be apparent from the disclosures in the accompanying drawings and specification.

The invention is illustrated in the drawings and hereinafter more fully described.

Figure 1:
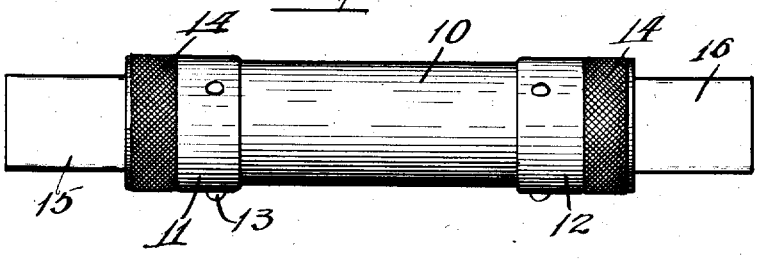
Figure 1 is an external view of a cartridge in which the fuse elements of this invention are adapted to be inserted.

A cartridge or enclosure of insulating material is indicated by the reference character 10, the cartridge having threaded metallic thimbles 11 and 12 secured to each end by rivets 13 or the equivalent. Knurled ferrule caps 14 screw onto each thimble to retain the knife terminals 15 and 16 in place.

Figure 2:
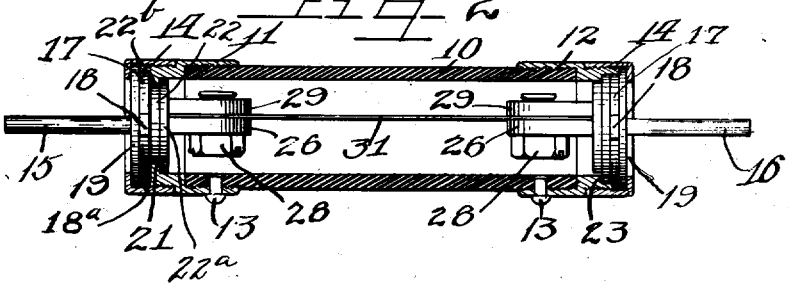
Figure 2 is a section through Figure 1 in a central plane vertical with respect to Figure 1.
Figure 6:
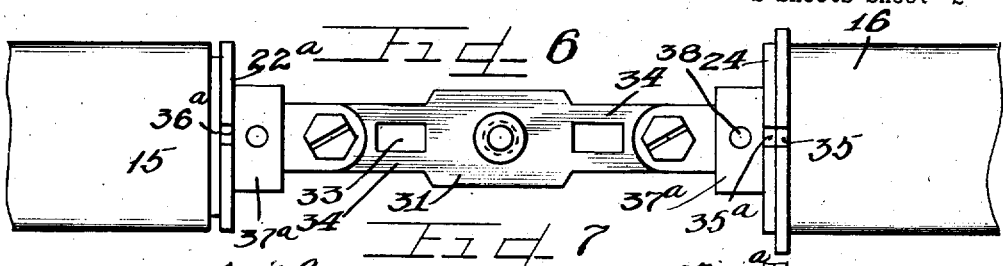
Figure 6 is a view of two fuse elements assembled together with the terminals.

The thimble 11 is provided with an inwardly extending flange 21 (see Figure 2) and is counterbored from the outside to a depth corresponding to the thickness of a disk 17 in the ferrule cap 14, slots in the thimble being provided to receive lugs 18 on the disk 17 when the latter is inserted in position from the left hand side. The knife terminal is provided with a disk 22 and backed by a larger disk 22*a* which are slidable through the thimble from the right hand side to engage the latter disc against the flange 21. The disk 22*a* has a cutout portion or passages for the escape of gases as at 36*a* (Fig. 6) which correspond with passages in the flange 21. The disc 22*a* which engages within the thimble flange 21 fits loosely and the disc 22 is smaller in diameter than the opening in the flange 21 and so provides a circular recess or groove 22*b* (Fig. 2) which establishes communication with the passages 36*a* and provides more space and tortuous vent passages for the escape of gases. The thimble 12 has a recessed shoulder 23 instead of a flange (Fig. 2) and is counterbored to a depth corresponding to the combined thickness of a disc 25 (Fig. 3) on the knife terminal 16 and the disc 17 in the ferrule cap 14 as shown in Fig. 2 and is slotted through the counterbored shoulder 23 to a depth equal to the thickness of the disc 17, which will engage lugs 18 on the disc 17, as shown in my co-pending application No. 656,315 of even date herewith; after the ferrule cap 14 has been screwed on the thimble 11.

Figure 3:
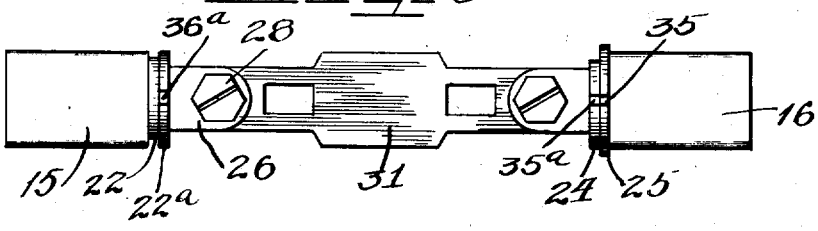
Figure 3 is a view of a fuse element assembled in its terminals prior to assembly in the cartridge.
Figure 4:
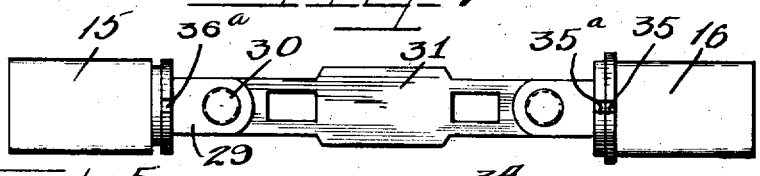
Figure 4 is a view from the side opposite to that of Figure 3.
Figure 5:
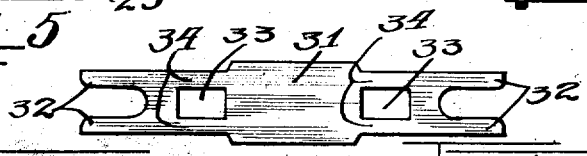
Figure 5 is a view of the fuse element alone.

The second knife terminal 16 is provided with a large disc 25 which is backed by a disc 24 which is attached or swaged in between the knife and the top of the disc 24. The disc 24 is of exactly the same size and construction as the disc 22*a* (Fig. 3) and has cutout portions or passages for the escape of gases as shown in 35*a*, the second larger disc 25 also having cutout portions or passages for the escape of gases as shown at 35, corresponding with the passages 35*a* in the disc 24 (Figs. 3 and 4).

Figure 7:
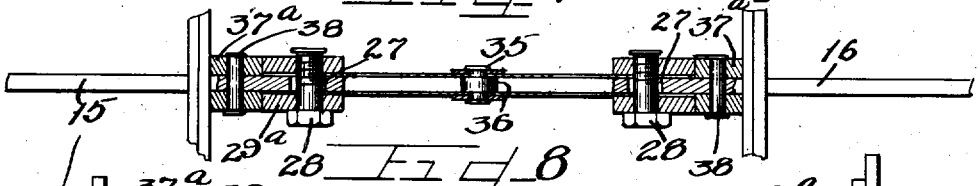
Figure 7 is a section corresponding to Figure 6.
Figure 8:
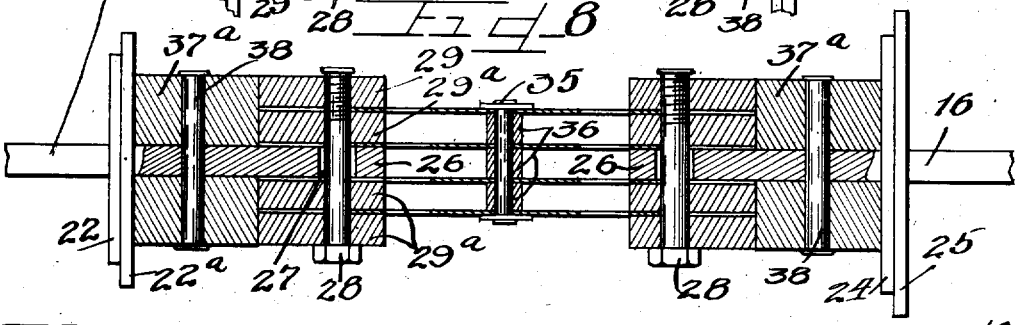
Figure 8 is a section of a four element fuse intended for a larger size cartridge.

An inner extension 26 of each knife terminal 15 and 16 has a slightly oblong hole 27 as shown in Figs. 7 and 8, through which a cap screw 28 is inserted and screwed into a block 29 and the end of the cap screw riveted over as at 30 to prevent complete withdrawal. The block is shaped to abut against the inner discs 22*a* and 24 on the terminals so that it cannot rotate when the cap screw is being tightened or withdrawn. This obviates the necessity of holding the parts with a tool, (Figs. 3 and 4). The cap screw has a limited range of motion sufficient for clamping a fuse element of given maximum capacity between the extension 26 and block 29 but prevents the insertion of two maximum or minimum fuse elements of such capacity.

In the larger capacities of fuses the extensions 26 of the terminal members 15 and 16 are preferably provided with collars or spacers 37*a* which, in the form shown in Figs. 6 to 10, are split and assembled with the extensions by means of rivets 38 passing through the extensions. The purpose of these collars is to extend the straight bottom above the disc so that the fuse elements need not be so long in the longer and larger fuses and to prevent the loose blocks 29 and 29*a* from turning while being tightened or loosened to clamp the fuse elements in place. The knurled ferrule caps 14 as shown in Fig. 2 have interior threads to fit the threads on the thimbles 11 and 12, the ferrule cap 14 is recessed above the threads and the disc 19 which is slightly smaller in diameter than the recess in the ferrule is provided with a slot and is sprung into a recess above the threads or is secured by spinning the ferrule end 20 over said disc 19 (Fig. 2). The second disc 17 is provided with a slot which is slightly wider at the sides than the slot in the disc 19. The disc 17 has lugs and is smaller in diameter than the threads in the ferrule cap which is permanently attached to the disc 19 by means of rivets, swaging or welding, and so the discs 17 and 19 as a unit are freely rotatable between threads and the recess in the ferrule cap 14, and are retained there as a unit. The disc 17 in the ferrule cap 14 as shown in Fig. 2 fits loosely in the counterbored shoulders 18*a* and 23, and in its slots in thimbles 11 and 12.

This application is directed more particularly to the fuse elements; a companion application being directed to the above described construction. The fuse elements comprise strips 31 of suitable resistance material of low melting point, having forked extensions 32 adapted to slip between the extension 26 and the block 29 to a position past the cap screw. These forked extensions and the method of assembling without removing the clamping screws and blocks assures a self-aligning element. The strip 31 is preferably of a wider section in the center to lower the current density and rectangular or oblong holes 33 are provided on either side of the wider section to define the locations 34 of maximum current density. It is to be noted that by the provision of straight sided or parallel fusing sections a greater area of the fuse will melt under overload thereby creating a larger gap. The provision of the two fusible sections 34 carrying current in parallel renders the blowing of the fuse more rapid and certain than with a single section as the separate smaller sections have greater radiating surface so that they will not heat up so much under normal load, while they will heat up more rapidly at the same overload than will a single larger section of an area equivalent to the sum of the smaller sections. It is not necessary that the oblong holes be exactly central as the current automatically divides in proportion to the area.

It will be noted that the provision of parallel fusing sections of appreciable length allows easy and certain calibration of the sections and consequent exact predetermination of the allowable capacity.

The forked extensions 32 serve not only to permit assembly of the elements without removal of the cap screws 28, but also to greatly facilitate the assembly by making the alignment of the element with the clamping blocks easy and certain. The forks thus tend to prevent bending of the element during assembly, a very common and exasperating fault with other forms of renewable fuse elements.

Figure 9:
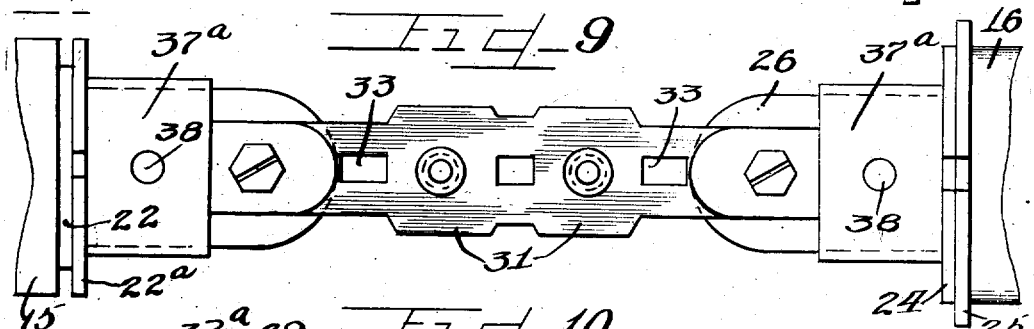
Figure 9 is a view of a modified form of multiple fuse elements.
Figure 10:
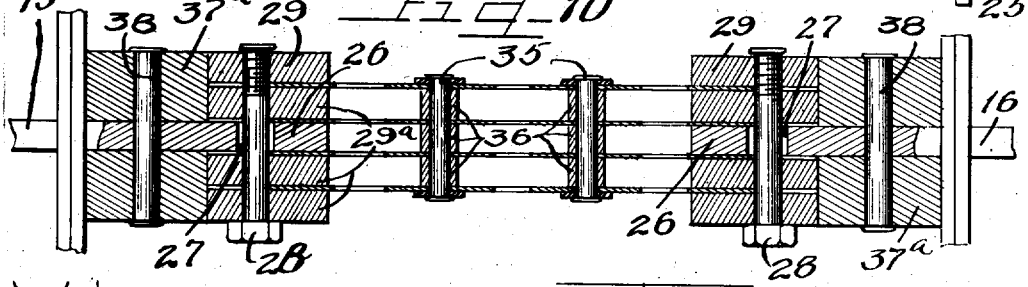
Figure 10 is a section on the center line of Figure 9.

The multiple links shown in Figures 6 to 10 comprise two or more links assembled on one or more rivets 35 with spacers 36 of thickness equal to that of the knife terminals. These spacers and rivets permit factory assembly of various capacities and insure the practically simultaneous fusing of each link even if the links are not absolutely identical in capacity. Further, the factory assembly of the multiple links allows very rapid assembly as the free ends of the elements are properly spaced from each other so that they slip right into their proper positions between the various spacers or blocks. Moreover, by loading the fusing elements the links will drop down as a unit on blowing assuring against an accidental short circuit after the fuse has once blown. In Figure 9 a supplementary central aperture, identical with those previously described, is provided to form an emergency break as a safety measure. The safety breaks are used for larger fuses wherein the elements are longer and designed to operate at higher voltage. With this construction two rivets are preferably employed for symmetry and to assure a more solid assembly.

I am aware that numerous details of construction may be varied through a wide range without departing from the principles of this invention, and I therefore do not purpose limiting the patent granted otherwise than necessitated by the prior art.

I claim as my invention:

1. A fuse element comprising a plurality of strips of fusible material, and means for permanently securing said strips together in a spaced relationship, with the ends of the strips extending free for individual attachment within a fuse cartridge 2. A fuse element comprising a plurality of uniform strips of fusible material having forked ends for attachment within a casing, said strips having portions of a minimum cross-section formed by apertures through the strips, and means for securing the strips together as a unit with the ends of the strips remaining free for individual attachment.

3. A self-aligning fuse element comprising a plurality of fusible strips secured together with free ends adapted to align the terminals of a cartridge fuse by insertion therein.

4. A fuse element comprising a plurality of strips of fusible material and means for permanently securing said strips together in spaced relationship of such character that strip ends are provided extending free for individual attachment to parts within a cartridge fuse, said integral strips being composed of alternate small sections and large multi-layer sections so arranged that when under substantially normal load the larger sections will as a result of the multi-layer structure thereof materially augment the radiating surface afforded the smaller sections to retard heating of said smaller sections and when subjected to an abnormal load such as a short circuit the melting of smaller sections will be substantially instantaneous.

5. A fuse element comprising a plurality of strips of fusible material and means for permanently securing said strips together in spaced relationship of such character that strip ends are provided extending free for individual attachment to parts within a cartridge fuse, said integral strips having large sections each connected to a materially smaller section, said larger sections being arranged and formed to augment the radiating surface afforded the smaller section so that under substantially normal load said smaller section will not heat up so rapidly and said smaller section being so proportioned and positioned relative to said larger sections that upon an overload such as a short circuit the smaller section will quickly melt.

6. A fuse element comprising a plurality of strips of fusible material and means for permanently securing said strips together in a given relationship of such character that strip ends are provided extending free for individual attachment to parts within the cartridge fuse, said integral strips being composed of alternate large and small sections and providing the larger sections with a plurality of layers of metal of sufficient amount and area as to materially enhance the radiating surface afforded the small sections whereby the heating of the small sections under substantially normal loads will be retarded.

7. A fuse element comprising a plurality of strips of fusible material permanently secured together between the ends of the element and so arranged at the ends of the element that there are provided free terminals for individual attachment to the parts with in the cartridge fuse, said integral strips providing the element with a plurality of multilayer large sections connected by smaller sections with said sections so arranged in proportion relative to each other that said small sections will instantly melt upon short circuit and whereby upon blowing of the fuse said larger sections due to the amount of metal therein will radiate heat thus augmenting the cooling of the element and whereby much less metal is volatilized.

In testimony whereof, I have hereunto subscribed my name at Chicago, Cook County, Illinois.

JOHN B. GLOWACKI.